Oct. 11, 1960   E. O. OLSEN ET AL   2,956,212
TRANSDUCING APPARATUS

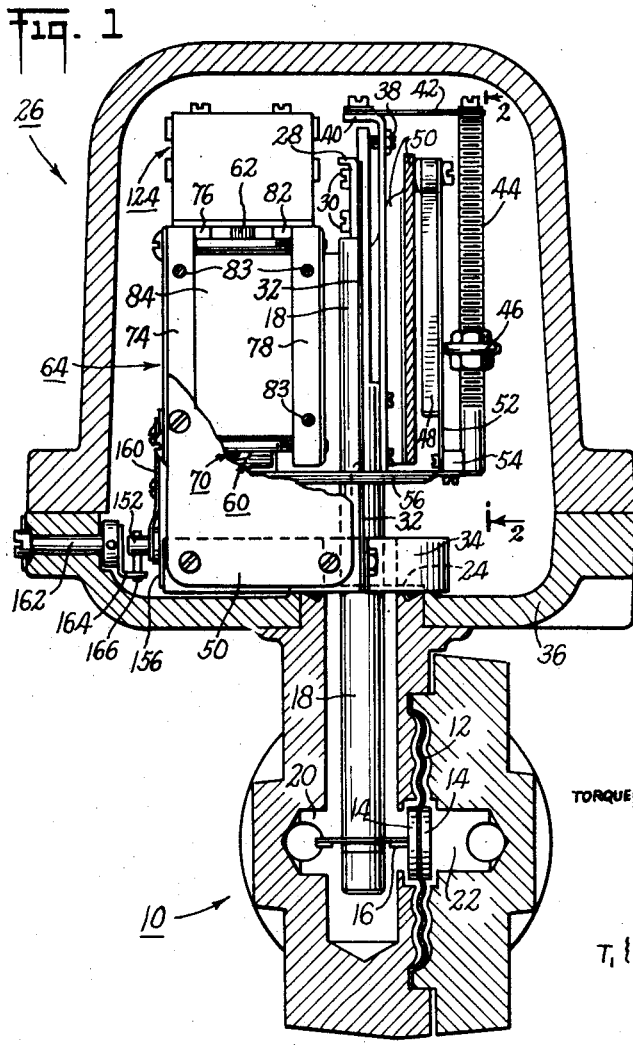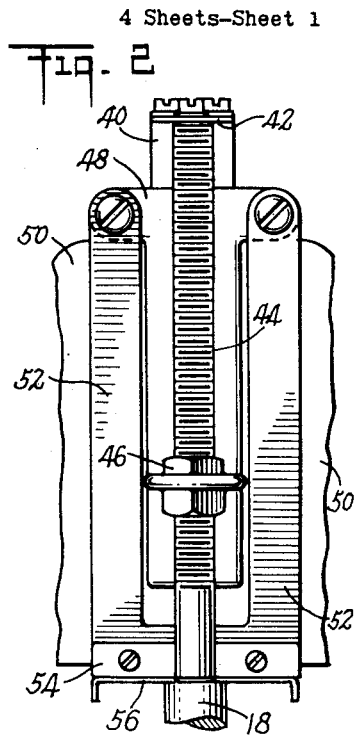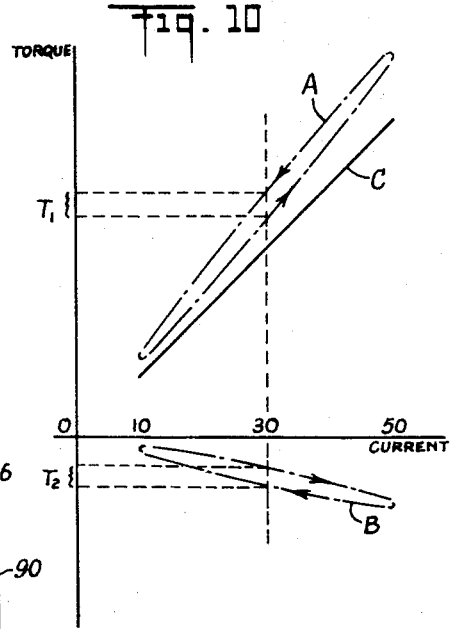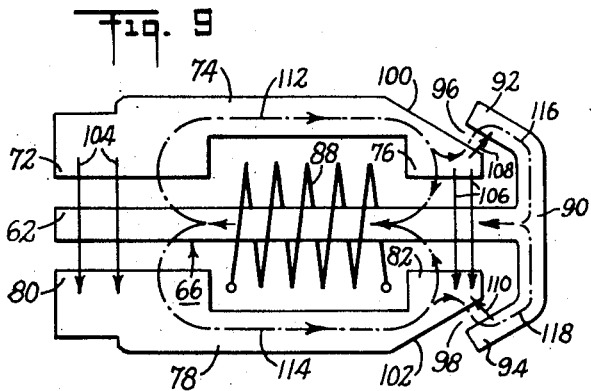
INVENTORS
Everett O. Olsen
Hoel L. Bowditch
BY
Curtis Morris + Safford
ATTORNEYS

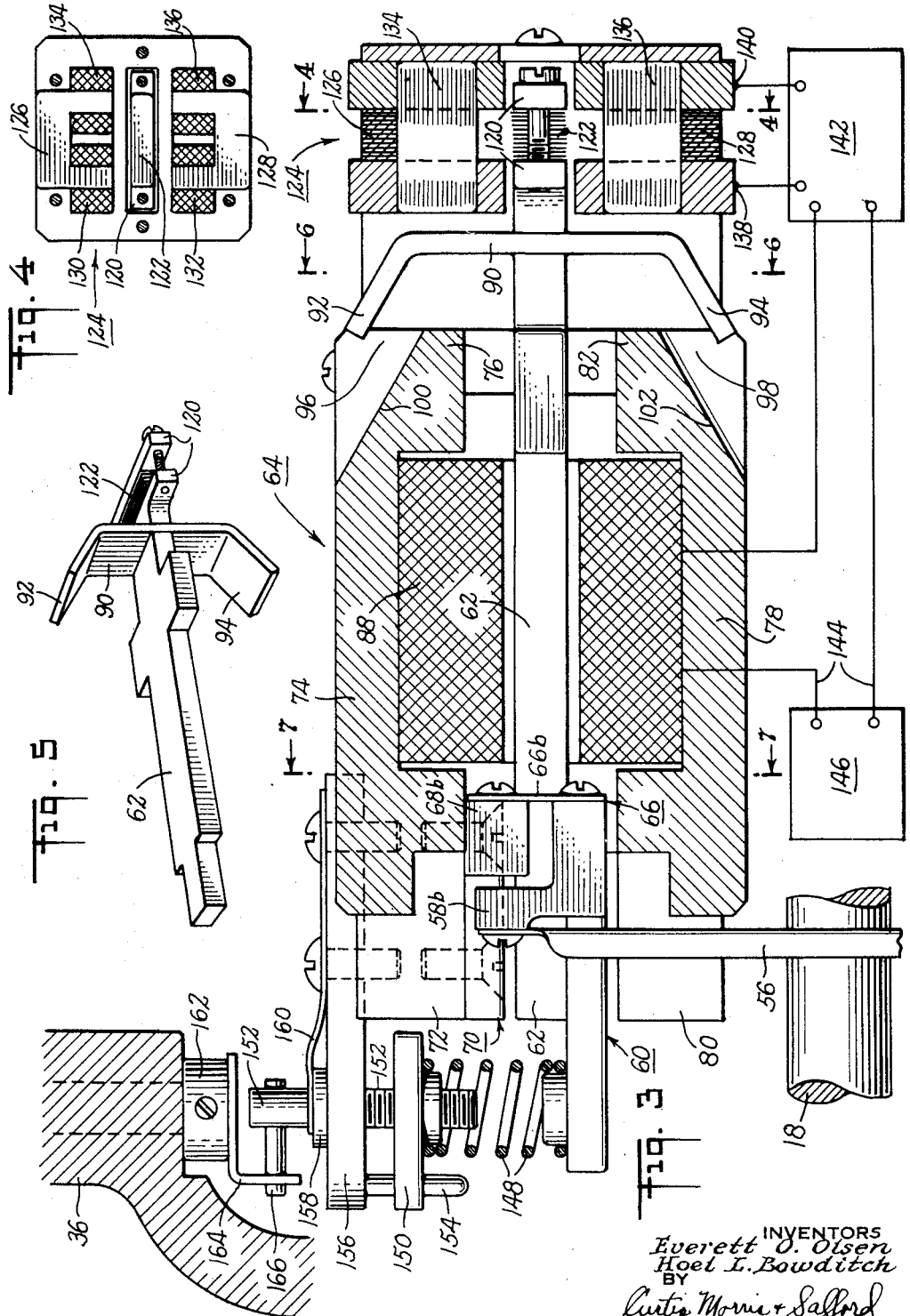

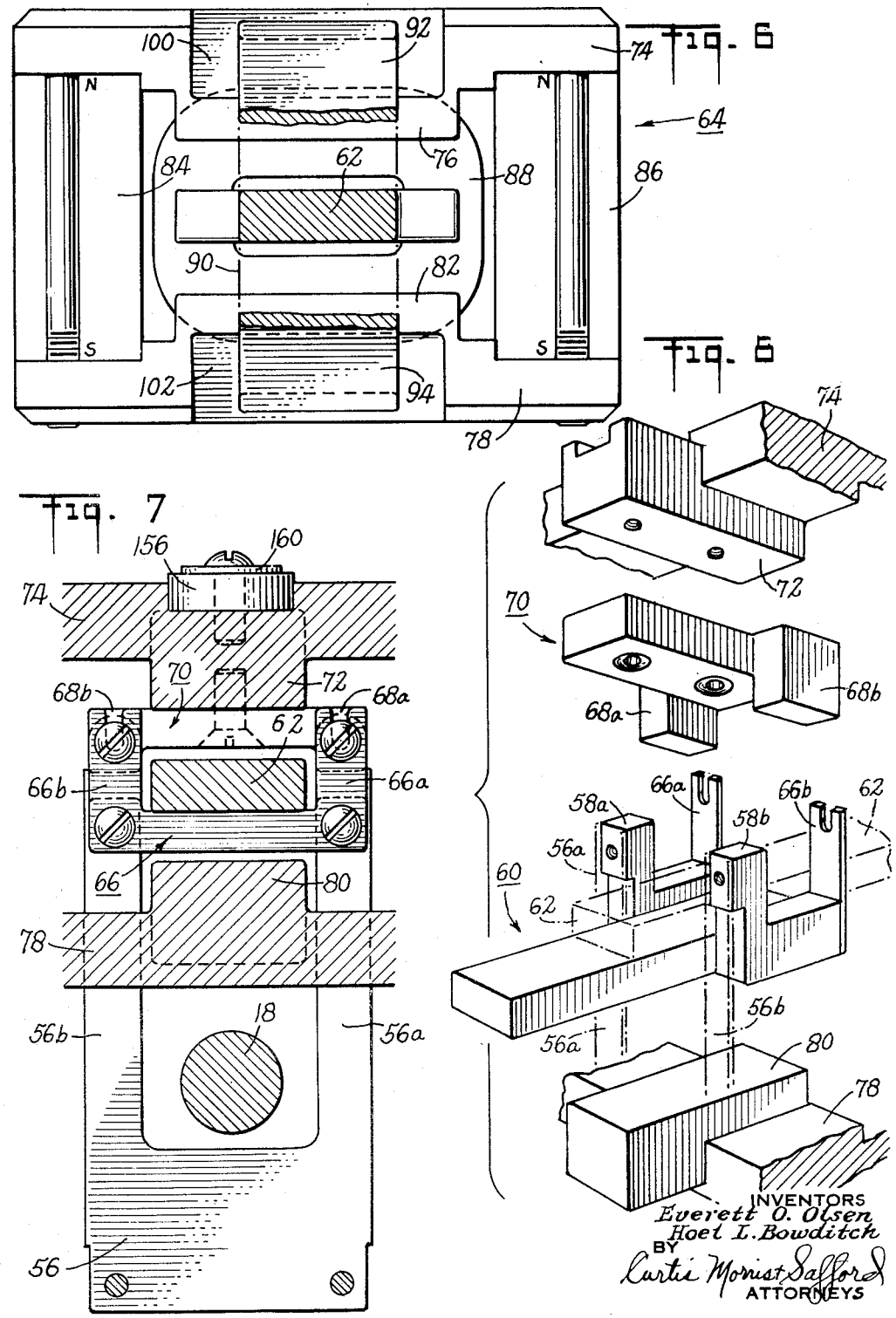

Filed Sept. 15, 1958   4 Sheets-Sheet 4

INVENTORS
Everett O. Olsen
Hoel L. Bowditch
BY
Curtis, Morris + Safford
ATTORNEYS United States Patent Office 2,956,212
Patented Oct. 11, 1960

2,956,212

TRANSDUCING APPARATUS

Everett O. Olsen, Wrentham, and Hoel L. Bowditch, Foxboro, Mass., assignors to The Foxboro Company, Foxboro, Mass.

Filed Sept. 15, 1958, Ser. No. 760,946

14 Claims. (Cl. 317—172)

This invention relates to apparatus used in transmitting or converting signal data in industrial instrumentation systems. More particularly, this invention relates to improved transducing apparatus of the type which includes an electrically-operated torque motor having very low hysteresis.

Electrical data transmission systems frequently require means for converting signals from a non-electrical signal, such as fluid pressure, to a corresponding electrical signal, and vice versa. For example, in measuring the flow rate of a liquid, the basic flow data generally will be in the form of a differential pressure, typically obtained by inserting an orifice in the liquid flow line. Thus a pressure-responsive device must be provided to convert the differential-pressure signal to a corresponding electrical signal.

Equipment of the so-called "force-balance" type has been proposed heretofore to effect this conversion. In such equipment, the input pressure is applied to a movable member the positioning of which is sensed by an electrical detector adapted to produce a corresponding electrical output signal. This output signal also is fed to a motor which applies a rebalancing force to the movable member in opposition to the input pressure so that, when the opposed forces on the movable member are in balance, the output signal reflects the magnitude of the input pressure. It will be apparent that the accuracy of signal conversion in such apparatus depends upon the precision with which the rebalancing motor operates, i.e. how closely its output force corresponds in magnitude to the electrical signal fed to it.

For many applications, it is desirable to use a high-powered rebalancing motor capable of delivering a substantial amount of torque, partly because this tends to assure stable operation under adverse environmental conditions such as shock and vibration. Motors of the "moving iron" type, i.e. wherein a movable magnetic armature is controlled by a magnetic flux field the intensity of which varies with changes in the motor current, are capable of providing relatively high output torque, and can be made physically compact. However, because of the variations in flux passing through the magnetic material, motors of this type provided heretofore have been subject to hysteresis effects which have severely limited their utility in the field of industrial instrumentation. That is, because of hysteresis the output torque produced by such prior motors would not correspond to the input current within acceptable tolerance limits. The present invention is directed to solving this and related problems.

Accordingly, it is one object of this invention to provide improved electric motor apparatus. It is a further object of this invention to provide a moving-iron torque motor adapted for use in signal-conversion apparatus and having very low hysteresis effects. It is a more specific object of this invention to provide improved apparatus for accurately converting a mechanical pressure signal to a corresponding electrical signal.

Other objects, advantages and aspects of the invention will be in part pointed out in, and in part apparent from, the following description of a preferred embodiment of the invention considered together with the accompanying drawings, in which:

Figure 1 is a cross-section, partly in elevation, of a differential-pressure instrument adapted to produce an electrical output signal corresponding to liquid flow rate;

Figure 2 is a detail side elevation, taken along line 2—2 of Figure 1, showing certain aspects of the force linkage;

Figure 3 is a longitudinal section through the torque motor showing certain parts in elevation;

Figure 4 is a cross-section, taken along line 4—4 of Figure 3, showing details of the position-sensing device;

Figure 5 is a perspective view of the motor armature and parts integral therewith;

Figure 6 is a cross-section taken along line 6—6 of Figure 3;

Figure 7 is a cross-section taken along line 7—7 of Figure 3;

Figure 8 is an exploded perspective view of the armature support;

Figure 9 is a diagrammatic view of the torque motor showing the various flux paths and air-gaps;

Figure 10 is a graph showing the changes in motor torque as a function of motor current;

Figure 11:
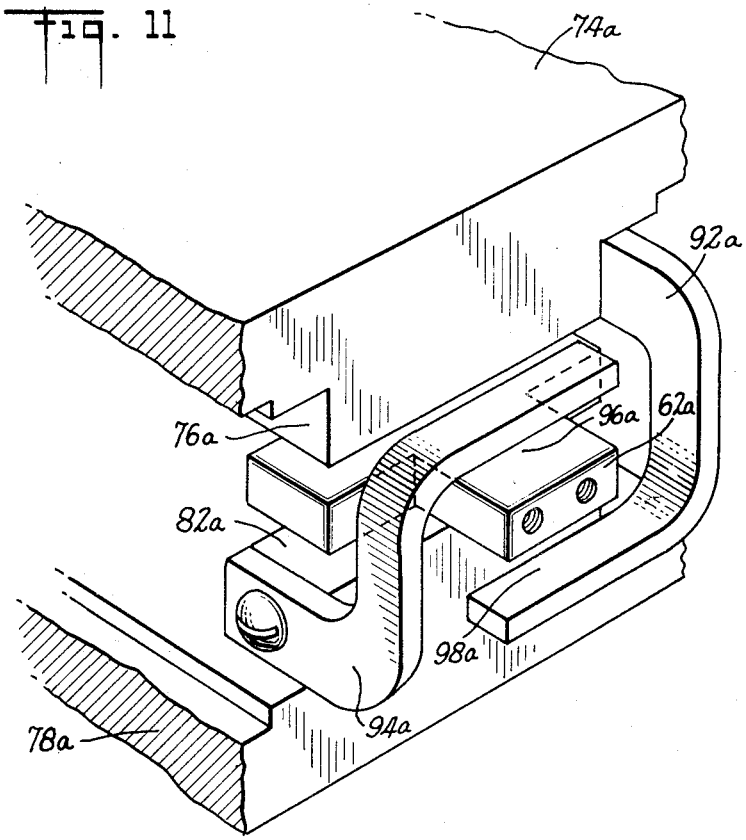
Figure 11 is a perspective view of a modified armature and pole piece construction.

Referring now to Figure 1, the differential pressure instrument shown there comprises a lower casing 10 which is substantially identical to that shown in U.S. Patent 2,806,480, issued to H. L. Bowditch on September 17, 1957. This lower casing houses a diaphragm 12 carrying a pair of discs 14 which are secured by a connector 16 to the lower end of a vertical force bar 18. A pair of input chambers 20, 22 are provided on opposite sides of the diaphragm and disc assembly, and are adapted to be respectively coupled (by the usual means not shown herein) to the downstream and upstream sides of an orifice inserted in a pipe carrying a fluid the flow rate of which is to be measured. The differential pressure developed across this orifice thus is applied as a leftwardly-directed force on the lower end of the force bar 18, the central portion of which is mounted for pivotal movement by a resilient diaphragm 24.

The force bar 18 extends above the diaphragm 24 into an upper casing 26 which houses the position-sensing and rebalancing torque motor apparatus to be described subsequently. The top of the force bar is secured by means of a bracket 28 and bolts 30 to a pair of long flexible strips 32 (only one of which is shown herein) which extend down along opposite sides of the force bar and are fastened at their lower ends to corresponding shoulders formed on a support pad 34. The support pad is, in turn, secured to the base member 36 of the upper casing 26. The flexible strips 32 prevent axial movement of the force bar 18 while permitting pivotal movement about the diaphragm 24.

The top of the force bar 18 is in contact with the end of a stud 38 which is adjustably secured to a vertical lever arm 40 the lower end of which is bolted to flats on the force bar 18. The top of this lever arm is formed with a flange to which is secured a flexible strip 42 the right-hand end of which is bolted to a vertical threaded rod 44. This rod carries an adjustment nut 46 (see also Figure 2) which bears against a T-shaped member 48 to serve as a pivot point for the rod. The lateral arms of the member 48 are bolted to a rigid cover plate 50 which, as shown in Figure 1, extends away from the member 48 and is fastened at its lower edges to opposite sides of the support pad 34.

The bolts at the top of the T-shaped member 48 also support a vertical U-shaped flexure 52 carrying at its bottom a cross bracket 54 which is welded to the lower end of the threaded rod 44. This bracket also is secured to a U-shaped drive plate 56 (see Figures 3 and 7) the arms 56a and 56b of which are formed with flanges along their side edges to provide stiffening. These arms extend around the force bar 18 and are connected at their remote ends (see Figure 8) to corresponding blocks 58a and 58b forming part of an armature support assembly 60, and to which is secured the magnetic armature 62 (see also Figure 5) of a torque motor generally indicated at 64 in Figures 1 and 3.

Reviewing the operation of the apparatus described thus far, when for example the flow rate of the fluid being measured increases, the resulting increase in differential pressure across the diaphragm 12 causes the bottom of the force bar 18 to be deflected to the left about the diaphragm 24. The upper end of the force bar consequently moves to the right a small amount (the extent of this movement is small because of the rebalancing action to be described), and correspondingly shifts the top of the threaded rod 44 to the right. The bottom of rod 44 therefore moves to the left an amount determined by the positioning of the adjustment nut 46, and carries with it the drive plate 56. The movement of this drive plate is transmitted to the armature 62 of the torque motor 64.

Referring now to Figures 3 and 8, the armature support assembly 60, along with armature 62, is pivotally mounted by a pair of flexible strips 66a, 66b which are fastened at their upper ends to corresponding blocks 68a, 68b integral with a frame member 70 formed of non-magnetic material. This frame member is, in turn, secured by a pair of screws to an upper pole piece 72 forming part of a magnetic core member 74 which extends along the full length of the armature and is provided at its right-hand end (Figure 3) with a second upper pole piece 76. A similar magnetic core member 78 is positioned on the lower side of the armature, and is provided with corresponding lower pole pieces 80, 82. These core members 74, 78 are secured (Figure 1) to the cover plate 50, as indicated by the screw holes 83, the cover plate extending around both sides of the torque motor 64.

As shown in Figure 6, a pair of permanent magnets 84, 86 are mounted between the side edges of the core members 74, 78 to produce flux of constant magnitude across the gaps between the respective pairs of pole pieces 72, 80 and 76, 82. These magnets are poled to produce flux in the same direction across both gaps e.g. referring to Figure 3, in a downward direction.

A motor control coil 88 is positioned around the armature 62 to produce flux axially through the armature and around the magnetic circuits formed by the magnetic core members 74, 78. To the right-hand end of the armature there is secured an auxiliary pole member 90 the outer ends 92, 94 of which are angled to form respective air gaps 96, 98 with the chamfered surfaces 100, 102 of the core members. The pole member 90 is formed of magnetic material having substantially higher hysteresis than the material of the armature 62 and core members 74, 78. In particular, the armature and core members are formed of a very high-quality magnetic material (such as that known commercially as "Hypernik") having about 2% hysteresis, while the pole member 90 is formed of ordinary cold-rolled steel having about 10–12% hysteresis.

To explain the operation of the torque motor 64, reference is made to Figure 9 which is a diagrammatic showing of the magnetic circuits of the torque motor. The constant flux produced by the permanent magnets is indicated by solid straight arrows 104, 106, 108, 110 crossing the various gaps. When current flows through the control coil 88, corresponding flux is produced through the armature 62 and the core members 74, 78, as indicated by the broken lines 112, 114, and also through the auxiliary pole member 90 as indicated by broken lines 116, 118.

When the coil flux is in the direction indicated by the arrowheads, the flux in the upper path 112 opposes the permanent magnet flux 104 leaving the upper left-hand pole piece 72, while the flux in the lower path 114 aids the permanent magnet flux entering the lower left-hand pole piece 80. Consequently, a downward force is applied to the armature 62 to the left of the pivot mounting 66. Similarly, the upper coil flux 112 aids the permanent magnet flux 106 leaving the upper right-hand pole piece 76, while the lower coil flux 114 opposes the permanent magnetic flux entering the lower right-hand pole piece 82. This produces an upward force on the armature to the right of the pivot mounting 66. The combination of these forces produces a net counterclockwise torque on the armature.

As the current in the motor control coil 88 is varied throughout its normal operating range, e.g. from 10 milliamperes to 50 milliamperes and back again to 10 milliamperes, the magnitude of the counterclockwise torque on the armature 62 varies correspondingly. However, because the magnetic material through which the coil flux passes has a hysteresis characterisic, the amount of torque produced for a given coil current will depend upon whether the coil current had just previously been increasing or decreasing. This effect is indicated generally by curve "A" of Figure 10 which shows (in approximate shape) a normal hysteresis loop for the torque produced by flux in the pole pieces 72, 80 and 76, 82 as the coil current is varied over the range of 10 to 50 milliamperes.

Taking, for example, the mid-range current of 30 milliamperes, it will be observed that the torque is less on the lower (increasing current) portion of the loop than on the upper (decreasing current) portion of the loop. This difference in torque is labeled "$T_1$". By using magnetic materials having very low hysteresis in the high-powered motor shown herein, this "torque differential" may be held at best to within about 2% of the maximum torque, which is not sufficiently accurate for an industrial measuring system. The manner in which the effect of such a torque-differential is substantially eliminated will now be explained.

Returning to Figure 9, the coil flux 116 in air gap 96 aids the permanent magnet flux 108, while the coil flux 118 in gap 98 opposes the permanent magnet flux 110. As a consequence, the auxiliary pole member 90 has applied to it a downward force which produces a clockwise torque on the armature 62 about its pivot mounting 66. This clockwise torque is in opposition to the principal counterclockwise torque produced by the flux through the pole pieces 72, 80 and 76, 82. However, the pole pieces and the auxiliary pole member are so arranged that the magnitude of the clockwise torque is a relatively small proportion, e.g. about 17%, of the counterclockwise torque.

Because of hysteresis in the auxiliary pole member 90, the clockwise torque also follows a hysteresis loop as indicated approximately at "B" in Figure 10. It may particularly be noted that, even though the clockwise torque produced by the gaps 96, 98 is substantially smaller than the main counterclockwise torque, the higher hysteresis of the cold-rolled steel of which auxiliary pole member 90 is formed causes the "torque differential" (e.g. as indicated at $T_2$) of the clockwise torque to be equal to the "torque differential" of the counterclockwise torque, for any given current. Thus, the hysteresis effects of the clockwise and counterclockwise torques cancel out, so that the net torque will be substantially linear as indicated by the straight line "C." In actual practice, the maximum hysteresis of the net torque on the armature 62 may be reduced to about .2%, which is well within the tolerances for an industrial instrumentation system.

Returning now to the operation of the overall differential-pressure measuring system, and referring to Figures 3 and 5, the armature 62 carries on its right-hand end a clamping device 120 which holds a small stack of magnetic laminations 122. These laminations form part of a position-sensing device generally indicated at 124 (see also Figure 4) comprising a pair of U-shaped cores 126, 128 carrying a pair of primary windings 130, 132 and a pair of secondary windings 134, 136. The primary windings are energized in series by alternating current, e.g. 60 c.p.s., by means not shown herein. The secondary windings are connected in series-opposition to a pair of output terminals 138, 140.

When the armature 62 is exactly in mid-position (as shown), the respective flux paths through the U-shaped cores 126, 128 and the laminations 122 will have equal magnetic reluctance, and consequently the voltages in the secondary windings 134, 136 will be equal. Thus the output voltage or terminals 138, 140 will be zero. As the armature is moved away from mid-position, the reluctances of the two flux paths through the cores 126, 128 will become unbalanced, and an A.-C. voltage, corresponding in magnitude to the deflection of the armature, will appear between the output terminals. This A.-C. voltage is fed to a conventional electronic amplifier generally indicated at 142, the output of which is a D.-C. signal proportional to its A.-C. input voltage. The D.-C. output signal is, in turn, fed through the coil 88 of the torque motor 64, and also is fed along a two-wire transmission line 144 to a remote station where it energizes a load element such as a recording device, a controller, etc., as indicated by the block 146.

Considering now the overall operation of the instrument, and assuming that the differential pressure applied to the input chambers 20, 22 increases, the resulting movement of the drive plate 56 (Figure 3) will tend to rotate the armature 62 in a clockwise direction about the pivot formed by flexure strips 66a, 66b. This movement will be detected by the position-sensing device 124 which will produce a corresponding increase in the A.-C. signal fed to the input terminals of the amplifier 142. The resulting increase in current through the motor control coil 88 will, in turn, increase the counterclockwise magnetic torque applied to the armature 62 until the net torque on the armature becomes zero and the armature is rebalanced in its new position. When rebalance has been achieved, the current flowing through the control coil 88 and the load element 146 will accurately correspond to the differential pressure applied to the input chambers 20, 22, and thus will reflect the flow rate of the fluid being measured.

The calibration of the instrument, i.e. how much the output current changes for a given change in differential pressure, is controlled by the setting of the adjustment nut 46 along the threaded rod 44. This arrangement provides a simple but very close and precise means of setting the calibration, and is especially advantageous because in manufacturing a number of these instruments the output characteristics of the torque motors will vary slightly from unit to unit due to variations in the magnetic material available commercially. Thus, in the factory each instrument can quickly be adjusted to suit the characteristics of the particular motor in that unit. Moreover, this adjustment means can be used to change the operating range of the instrument, e.g. when it is desired to shift the instrument from one measuring application to another.

The zero setting of the instrument is controlled by a spring 148 (Figure 3) which presses against the left-hand end of the armature 62 so as to produce a torque in opposition to the torque developed by the drive plate 56. The remote end of this spring engages a nut 150 on a threaded shaft 152. One side of the nut is apertured to receive a guide pin 154 which prevents the nut from rotating when shaft 152 is turned, so that the nut will move axially to vary the compression of spring 148. The shaft passes through a hole in an extension piece 156 which is bolted into a recess formed in the upper core member 74. The shaft 152 also is provided with a collar 158 and a spring finger 160, mounted on extension 156, to prevent axial movement of the shaft. Rotation of the shaft is effected by a rod 162 carrying a crank arm 164 engaged with a drive pin 166 mounted on the shaft. The outer end of the rod is slotted to receive a screw driver so that the zero setting of the instrument can readily be adjusted from outside of the upper casing 26.

For some applications, it is important to use a torque motor having a very fast response, e.g. to minimize hunting in certain types of rebalanceable measuring systems of the general kind described above. The motor construction shown in Figures 11 and 12 has this advantage, which is obtained by a unique arrangement wherein the effective inertia of the motor armature is substantially reduced.

Figure 12:
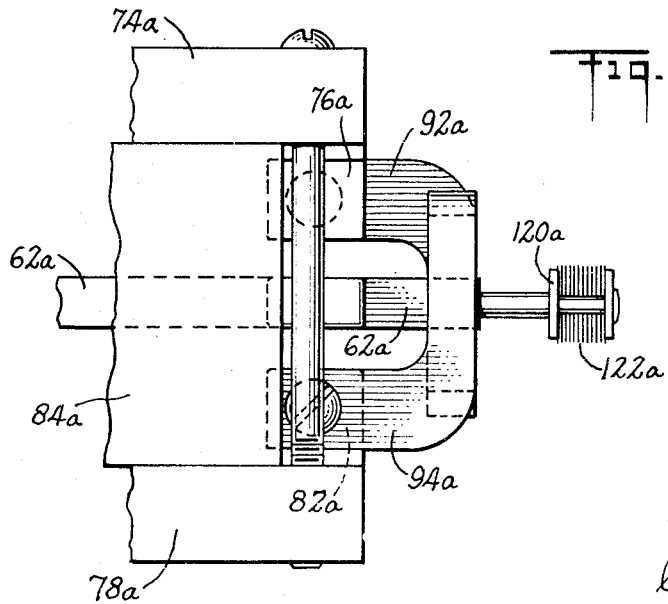
Figure 12 is a side view of the arrangement shown in Figure 11.

The motor arrangement of Figures 11 and 12 is identical in most respects to motor 64 previously described, and therefore these latter drawing figures show only the parts of the motor that are of different construction. Those elements of the modified arrangement that correspond to similar elements of the other motor have been identified in the drawings with the same reference numbers followed by distinguishing letters.

Referring now to Figures 11 and 12, the motor includes upper and lower core members 74a, 78a each having at its right-hand end a corresponding pole piece 76a, 82a respectively. As before, permanent magnets are mounted between the side edges of the core members to produce flux down across the gap between the pole pieces. The armature 62a extends between the pole pieces to be acted on by the flux in this gap as before.

In this modified construction, the pole pieces 76a, 82a carry respective pole members 92a, 94a which extend around to opposite sides of the armature 62a and establish corresponding air-gaps 96a, 98a. As before, these pole members are formed of magnetic material having substantially higher hysteresis than the material of which the armature and core members 74a, 78a are formed, in order to compensate for hysteresis effects in these latter parts. It will be observed, however, that the pole members are fixed to the core members, rather than being carried by the armature, so that the effective mass of the armature is thereby reduced. Hence the armature can respond more quickly to an applied force.

In operation, if the flux produced in the armature 62a by the motor control coil (not shown in Figures 11 and 12) is in a leftward direction as indicated in Figure 9, there will be a net counterclockwise torque produced on the armature by the flux passing through the pole pieces 76a, 82a, as before. However, the coil flux passing up through gap 96a will aid the permanent magnet flux through this gap, while the coil flux passing down through gap 98a will oppose the permanent magnet flux through this latter gap. Thus, the resulting unbalance of flux in gaps 96a, 98a will cause the armature 62a to be attracted to the lower pole member 92a, and thereby produce a clockwise torque on the armature. The magnitude of this clockwise torque is substantially less than the magnitude of the main counterclockwise torque, but the percentage hysteresis of the pole members is substantially greater (e.g. by an amount equal to the ratio of the two torques) than the percentage hysteresis of the armature and core members. Therefore, the hysteresis effects effectively cancel out as explained in connection with the motor 64 shown in Figure 3.

As also shown in Figure 12, the armature 62a carries on its right-hand end a clamping device 120a holding a stack of magnetic laminations 122a for use in a position-sensing device of the type indicated at 124 in Figure 3, the details of which therefore are not shown in Figure 12.

Although specific preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. For use in signal-transducing apparatus and the like, an electrically-operated motor comprising a movably-mounted armature, magnetic material establishing a first magnetic circuit coupled to said armature, energizing means for producing flux in said first magnetic circuit to apply a driving force to said armature, and a second magnetic circuit coupled to said armature to apply an auxiliary force thereto in accordance with the flux produced by said energizing means, said second magnetic circuit having hysteresis characteristics substantially different from the hysteresis characteristics of said first magnetic circuit and constructed and arranged to reduce the overall effects of hysteresis on the output of the motor.

2. Motor apparatus comprising a movably-mounted magnetic armature, magnetic material establishing a first magnetic circuit coupled through an air gap to said armature, a coil for producing flux through said first magnetic circuit to apply a driving force to said armature, and a second magnetic circuit coupled to said armature to apply a counterforce thereto in accordance with the flux produced by said coil, said second magnetic circuit including material having substantially greater hysteresis effects than said first magnetic circuit, whereby to minimize the effects of hysteresis on the output of the motor.

3. Torque motor apparatus comprising a pivotally-mounted elongated armature formed of magnetic material, a magnetic core including a pair of pole pieces each positioned near a respective end of said armature and coupled thereto by a corresponding air-gap, magnet means for producing flux of constant magnitude through said pole pieces and across said air-gaps to said armature, a coil positioned around said armature for producing flux through said air-gaps and said core member to apply a torque to said armature in accordance with the magnitude of the coil current, and a magnetic pole member coupled to said armature to apply a counterforce thereto in accordance with the flux produced by said coil, said magnetic pole member being formed of material having a substantially higher hysteresis characteristic than the material of said magnetic core, whereby to substantially eliminate the effects of hysteresis on the output of the motor.

4. A torque motor comprising an elongated armature formed of magnetic material and pivotally mounted for rotary movement, first and second magnetic core members on opposite sides of said armature, said core members being formed at their ends with corresponding pole pieces establishing respective air-gaps through which said armature extends, permanent magnet means for producing flux of essentially constant magnitude across said air-gaps between said core members, a coil wound around said armature to produce flux through said armature and through the magnetic circuits formed by said core members so as to apply a driving torque to said armature in accordance with the magnitude of the coil current, and a third magnetic core member coupled to said armature and said permanent magnet means to apply a counter torque to said armature in accordance with the magnitude of the coil current, said third core member being formed of material having a substantially higher hysteresis characteristic than the material of said first and second core members and arranged to effectively eliminate the effects of hysteresis on the output of the motor.

5. Motor apparatus comprising a movably-mounted armature, a magnetic core member arranged generally in the shape of a "C", the ends of said member serving as pole pieces to establish corresponding air-gaps with said armature, magnet means for producing flux of constant magnitude through said air-gaps, a coil for producing flux through said armature and across said air-gaps to apply a driving force to said armature, and a magnetic pole member coupled to said armature to apply a counterforce thereto in accordance with the flux produced by said coil, said magnetic pole member having substantially greater hysteresis than said magnetic core member, whereby to minimize the effects of hysteresis on the output of the motor.

6. Motor apparatus comprising a pivotally-mounted and elongated armature formed of magnetic material, a magnetic core including a pair of pole pieces positioned near the respective ends of said armature and in the plane of movement of said armature about its pivot mounting, magnet means for producing flux of constant magnitude through said pole pieces, a coil positioned around said armature for producing flux of controllable magnitude through said magnetic core to apply a driving torque to said armature in accordance with the coil flux, and a magnetic pole member coupled to one end of said armature and beyond the portion thereof lying between said pole pieces, said pole member being arranged to apply a counter torque to said armature in accordance with the flux produced by said coil, said magnetic pole member being formed of material having a substantially higher hysteresis characteristic than said magnetic core member, whereby to minimize the effects of hysteresis on the output of the motor.

7. Motor apparatus comprising a movably-mounted armature, magnetic material establishing a first magnetic circuit coupled through an air gap to said armature, a coil for producing flux through said first magnetic circuit to apply a driving force to said armature, and a second magnetic circuit coupled to said armature to apply a counterforce thereto in accordance with the flux produced by said coil, said second magnetic circuit having substantially greater hysteresis than said first magnetic circuit, the shape of the hysteresis loops for said two magnetic circuits being substantially identical throughout the normal operating range of said motor, whereby to minimize the effects of hysteresis on the output of the motor throughout the full range thereof.

8. Motor apparatus comprising a pivotally-mounted armature formed of magnetic material, a magnetic core member including on one side thereof a pole piece positioned to establish an air gap near one end of said armature, said armature being mounted for movement towards and away from said pole piece, magnet means for producing flux of constant magnitude through said pole piece and across said air gap, a coil coupled to said armature for producing flux of controllable magnitude through said pole piece to apply a driving torque to said armature in accordance with the coil flux, and a magnetic pole member secured to said armature and positioned adjacent the side of said core member that is opposite to said one side, whereby the flux passing between said pole member and said core member produces a counter torque on said armature in opposition to said driving torque, said magnetic pole member being formed of material having a substantially higher hysteresis characteristic than said magnetic core member so as to minimize the effects of hysteresis on the output of the motor.

9. Apparatus as claimed in claim 8, including a pair of core members mounted on opposite sides of said armature and having corresponding pole pieces near one end of said armature, said pole member being formed to extend along the outsides of both of said core members adjacent surfaces thereof that are remote from said armature.

10. Apparatus as claimed in claim 9, wherein said core member outside surfaces are inclined at an angle with respect to the axis of said armature, said pole member being angled to correspond to said outside surfaces.

11. Motor apparatus comprising a movably-mounted magnetic armature, a magnetic core member having a pole piece adjacent said armature, means to produce flux through said core member and said armature to apply a driving force to the armature, a magnetic pole member secured to said core member and arranged to extend around said armature to the side thereof that is opposite said core member, the flux passing between said pole member and said armature applying a counter torque thereto in opposition to said driving torque, said pole member being formed of material having substantially higher hysteresis than the material of said magnetic core member, whereby to minimize the effects of hysteresis on the output of the motor.

12. A motor as claimed in claim 11, including a pair of core members on opposite sides of said armature, each of said core members carrying a pole member which extends around said armature to the side thereof that is opposite the respective core member, said pole members having substantially higher hysteresis than said core members.

13. Current-responsive apparatus adapted to produce an output force corresponding in magnitude to an input current, and wherein said output force is substantially free from hysteresis effects; said apparatus comprising: magnetic material defining a first magnetic path; an output member magnetically coupled to said first magnetic path; flux-producing means arranged to produce through said first magnetic path a magnetic flux for applying a driving force to said output member; and magnetic material defining a second magnetic path coupled to said output member to apply a force thereto in accordance with flux passing through said second magnetic path, the hysteresis characteristics of said second magnetic path being different from the hysteresis characteristics of said first magnetic path to reduce the effects of hysteresis on the force applied to said output member.

14. Apparatus as claimed in claim 13, wherein said flux-producing means includes a current-energizable winding coupled to both said first and second magnetic paths.

References Cited in the file of this patent

UNITED STATES PATENTS

| | | |
|---|---|---|
| 2,593,339 | Ostermann et al. | Apr. 15, 1952 |
| 2,602,660 | Shannon | July 8, 1952 |